US005096091A

United States Patent [19]

Heu

[11] Patent Number: 5,096,091

[45] Date of Patent: Mar. 17, 1992

[54] MAGNETIC ROLLER PAPER CLIP DISPENSER

[76] Inventor: Nick Heu, 5 F, No. 44, Alley 3, Lane 550, Min-Chung East Road, Taipei, Taiwan

[21] Appl. No.: 496,265

[22] Filed: Mar. 20, 1990

[51] Int. Cl.$^5$ .............................................. B65G 59/04

[52] U.S. Cl. .................................................... 221/212

[58] Field of Search ............... 221/212, 217, 255, 277, 221/281; 206/340, 350, 818, 341, 337, 336

[56] References Cited

U.S. PATENT DOCUMENTS 3,750,868 8/1973 Cooper .......................... 221/212 X
4,047,637 9/1977 Grunstad et al. ............... 206/340 X
4,058,209 11/1977 Schmidt .......................... 221/212 X
4,796,780 1/1989 Huang ............................. 221/212 X

FOREIGN PATENT DOCUMENTS 1409537 10/1975 United Kingdom ................ 206/350

*Primary Examiner*—David H. Bollinger

[57] ABSTRACT

A magnetic roller paperclip dispenser comprising a two piece housing, a cylindrical, fluted magnetic roller accessibly disposed in a front portion thereof, and a window cover disposed over a rear portion thereof. Paperclips are stored in an internal storage cavity with a downwardly sloped storage surface so that paperclips thereon slide down towards the magnetic roller and adhere thereto. A user can rotate the magnetic roller by fingertip action to cause the paperclips adhering thereto to pass through a gap between the roller and the front edge of the window cover, to the exterior of the dispenser where they can be removed for use.

2 Claims, 2 Drawing Sheets

MAGNETIC ROLLER PAPER CLIP DISPENSER

BACKGROUND OF THE INVENTION

The present invention relates to a paperclip dispenser, and more particularly to a paperclip dispenser utilizing a magnetic roller.

Conventional paperclip dispensers suffer from numerous deficiencies. They usually require the opening and closing of a lid or flap that covers a container holding paper clips. Aside from the added time and inconvenience of having to open and close the lid, the container when copiously supplied with paper clips often requires the user to do some manipulation with his fingers to remove a single paper clip from a heap. If the container was nearly empty, his fingers would have to grope for a paper clip unless the user was directly viewing the dispenser.

The magnetic roller paperclip dispenser of the present invention avoids these inconveniences by having a magnetic roller to which paperclips within the dispenser adhere to. The surface of the magnetic roller, which is fluted with raised fillets on its surface, is exposed to the front, so as to allow a user to easily rotate the roller with his fingertips and bring forth a paperclip for removal.

SUMMARY OF THE INVENTION

The magnetic roller paperclip dispenser of the present invention has as a primary objective to provide a paperclip dispenser that allows a user to access paperclips within the dispenser with a minimum of time and action.

The magnetic roller paperclip dispenser of the present invention comprises a two piece housing, a cylindrical roller accessibly disposed in the front thereof, and a window cover hingedly disposed to the rear thereof, covering an internal storage cavity therein for the paperclips.

A detailed description of the paperclip dispenser of the present invention along with accompanying drawings is provided below.

DETAILED DESCRIPTION OF THE PREFERRED EMBODIMENT

Figure 1:
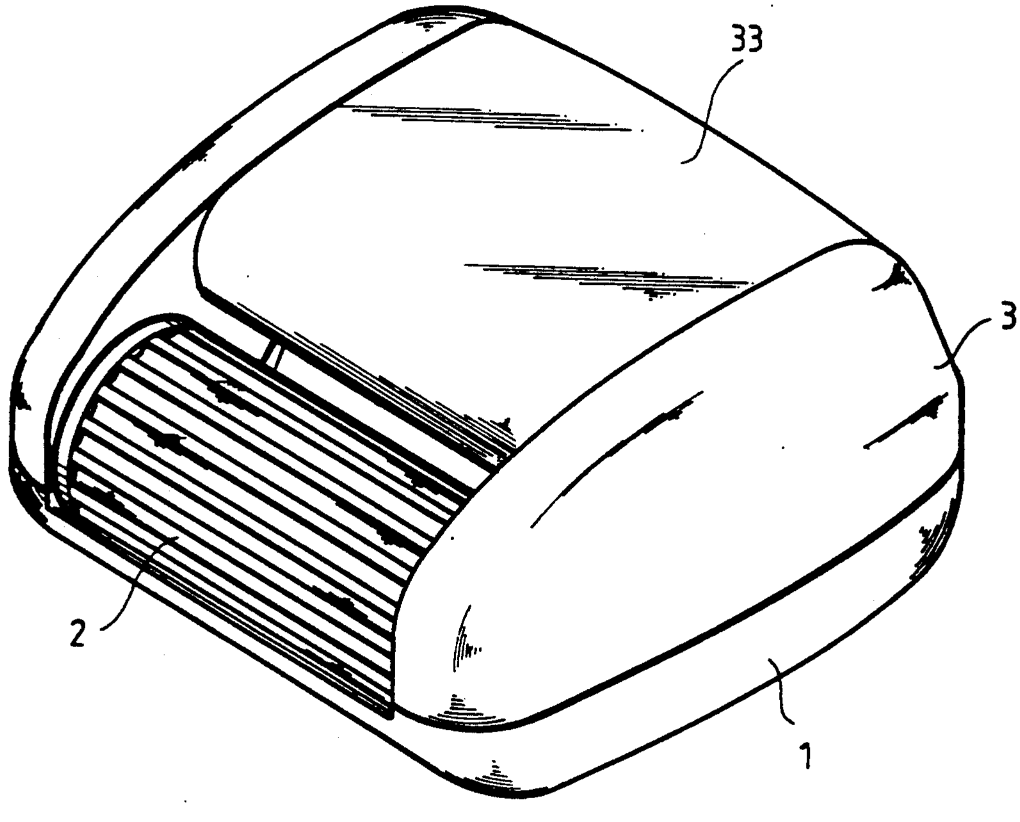
FIG. 1 is a perspective assembled view of the magnetic roller paperclip dispenser of the present invention.

Referring to FIG. 1, the magnetic roller paperclip dispenser of the present invention comprises a lower shell 1, an upper shell 3 having a roughly U shape when viewed from the top, a window cover 33, and a magnetic roller assembly 2.

Figure 2:
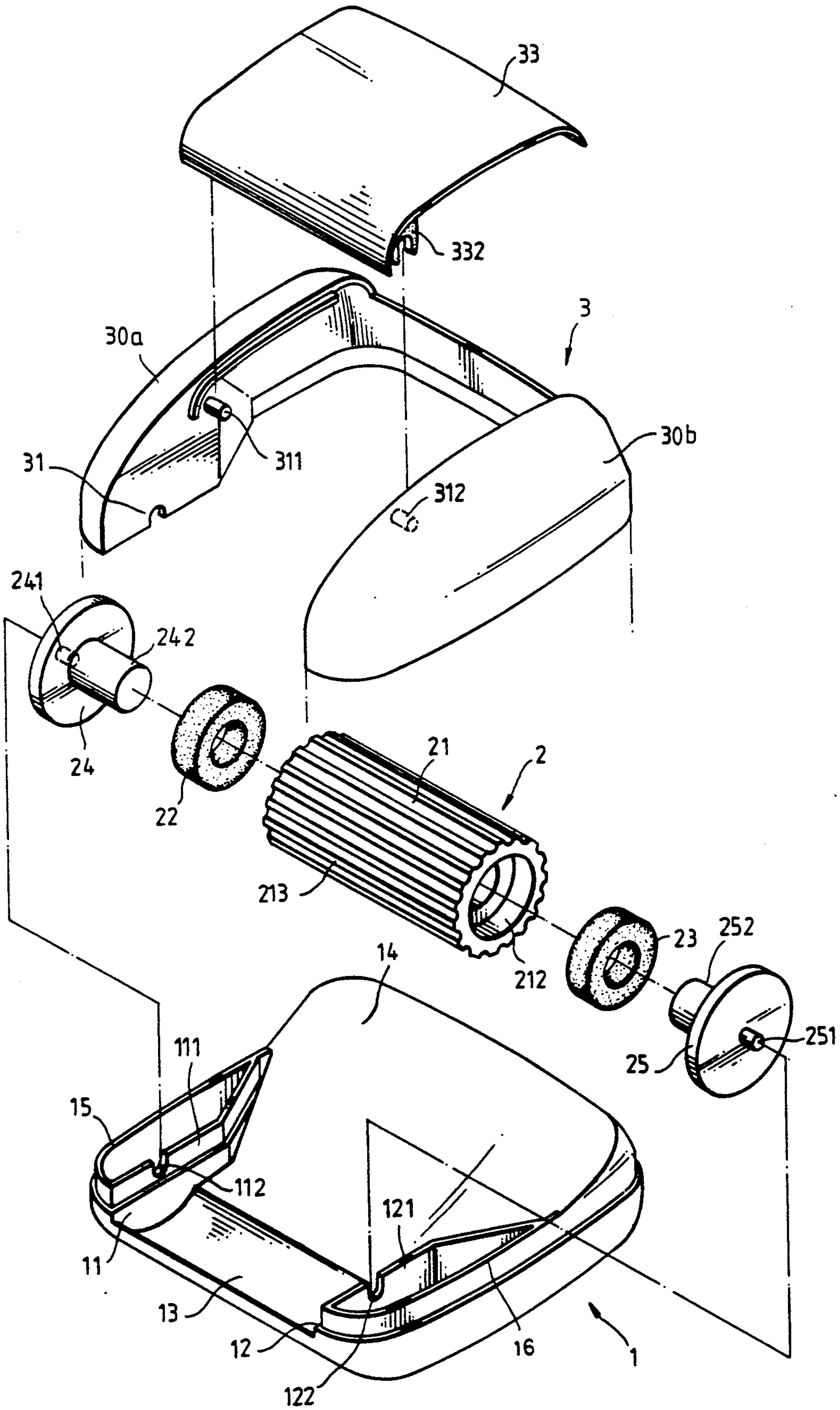
FIG. 2 is a perspective exploded view of the magnetic roller paperclip dispenser of the present invention.

The internal structure of these members are shown clearly in the exploded view of FIG. 2.

Magnetic roller assembly 2 can be seen to comprise a fluted roller 21, with a plurality of elongate, raised fillets 213 formed around the outer periphery thereof, a pair of generally ring-shaped magnets 22 and 23, and a pair of roughly disk-shaped end pieces 24 and 25.

Ring-shaped magnet 23 is disposed in a cylindrical recess 212 formed in one end of roller 21, and is secured therein by end piece 25 which has a cylindrical plug 252 on the inner side thereof which passes through magnet 23 and into an axial bore in roller 21 to form a friction fit therewith.

End piece 24 and magnet 22 are similarly positioned in the opposite end of roller 21.

Completed roller assembly 2 is disposed in a conformingly shaped roller receiving well 13 formed in a front portion of lower shell 1. A protruding axle 241 on the outer side of end pieces 24 rests within a generally semicircular shaped notch 112 formed on an internal side wall 111 of lower shell 1, adjacent with a corresponding side face 11 of receiving well 13. A similar protruding axle 251 on end piece 25 also rests against a similar notch 122 formed on the opposing internal side wall 121 of lower shell 1, adjacent with the corresponding side 12 of receiving well 13.

When upper shell 3 is inserted and positioned over lower shell 1, a generally semicircular shaped recessed notch 31 formed on a lower edge of a corresponding side portion 30*a* of upper shell 3, towards the front thereof, is juxtaposed with notch 112 on lower shell 1 to define a bearing for axle 241.

A similar notch (not shown) formed on a corresponding portion of side 30*b* of upper shell 3 is juxtaposed with notch 122 of lower shell 1 to define a bearing for axle 251.

Window cover 33 has a pair of recessed hinging lugs 332, formed on respective lateral sides of cover 33 near the front edge thereof, which are snap fitted over respective inwardly projecting pins, 311 and 312, formed on an inner wall of respective side portions, 30*a* and 30*b*, at aligned positions thereon to the rear of roller 21, to hingedly secure cover 33 to upper shell 3.

Figure 3:
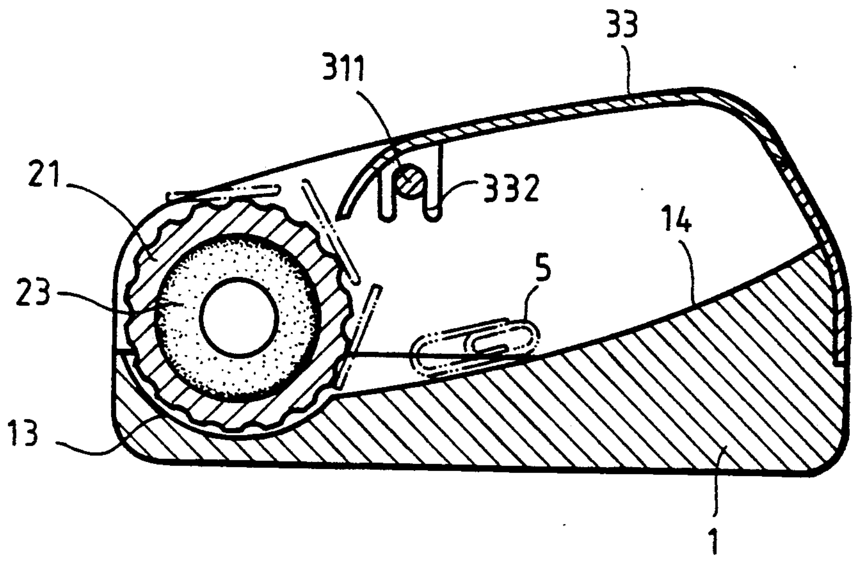
FIG. 3 is a sectional side view of the magnetic roller paperclip dispenser of the present invention.

An arcuate, downwardly sloped storage surface 14 is formed in lower shell 1 to the rear of receiving well 13, with storage surface 14 and window cover 33 defining a storage cavity for paperclips 5, as shown in FIG. 3.

In operation, gravity causes paperclips 5 in the storage cavity to slide down storage surface 14 towards magnetic roller 21 which attracts paperclips 5 to the outer periphery thereof.

A user could then rotate roller 21 with his or her fingertips, facilitated by fillets 213 thereon, so that paperclips 5 attracted onto the outer periphery thereof pass through a gap 4, defined between the front edge of window cover 33 and roller 21, to the exterior of the dispenser where they can be removed for use.

I claim:

1. A magnetic roller paper clip dispenser comprising:

a lower casing having a gradually sloping surface on a back of said lower casing, a roller receiving space on a bottom of said lower casing, and two opposite bases on opposite sides of said lower casing respectively;

an upper inner wall and an upper outer wall disposed on a top of each said base;

each said upper inner wall having a generally U-shaped recess therein;

a generally U-shaped upper cover having two lateral arms and an access cover, said access cover disposed between said two lateral arms to form a smooth upper surface;

said upper cover disposed on top of said lower casing;

a magnetic roller assembly having a fluted roller with two cylindrical recesses on two opposite ends of said fluted roller respectively, two ring magnets disposed on said two cylindrical recesses respectively, and two journals inserted into said two ring magnets respectively; and said journals being received in said U-shaped recesses of each said upper inner wall.

2. A magnetic roller paperclip dispenser according to claim 1, wherein said storage surface of said lower shell is arcuate and downwardly sloping so that said paper clips stored therein slide downwards toward said magnetic roller under the influence of gravity.

* * * * *